UNITED STATES PATENT OFFICE 2,405,743

INSECTICIDAL COMPOSITIONS

Samuel I. Gertler, Washington, D. C., assignor to United States of America as represented by the Secretary of Agriculture and his successors in office No Drawing. Application June 27, 1945, Serial No. 601,914

13 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to insecticidal compositions for destroying or checking the growth or multiplication of living organisms, whether plant or animal, which are economically injurious to man.

An object of the invention is to provide insecticidal compositions for dusting or spraying delicate vegetation such as bean plants, peach trees, and plants grown under glass, which will not cause injury to foliage.

A further object of the invention is to provide insecticidal compositions which are relatively nontoxic to man and to domestic animals when taken by mouth, and which can be used in the place of lead arsenate and other arsenicals for destroying insects without leaving harmful residues on fruits and vegetables.

Other objects will be apparent from the following description of the invention.

I have found that a phenylhydrazide of an aromatic sulfonic acid which may be designated by the general formula

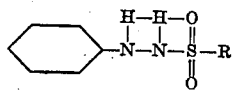

in which R is selected from the group consisting of phenyl and tolyl radicals, when incorporated in a carrier to form a spray or dust composition, and when so applied to material liable to attack by insects, has specific toxic effects upon harmful insects. The carrier forming a dust composition is a mixture of a dust, like pyrophyllite or pyrax, with a sticking agent like glue, casein, rosin, and so forth. The carrier forming a spray composition is a mixture of a dust, like pyrophyllite, or pyrax, a wetting agent, such as saponin, sodium lauryl sulfate, soap, and so forth, and water, the function of the wetting agent being to form a suspension of the compound in the water when the compound is incorporated therein.

In the following examples, which are illustrative of the invention, a dust composition will be understood to be a composition comprising the compound shown, a suitable dust, and a sticking agent. A spray composition will denote a suspension of the compound, a suitable dust, and a wetting agent, in water. In all the examples where a spray composition was used on the European corn borer, the concentrations shown denote the use, substantially, of the pure compound per 100 gallons of water. In all other cases, the spray compositions denote concentrations of the mixture of the compound and the respective spray carrier per 100 gallons of water.

EXAMPLE 1

*1-phenyl-2-phenylsulfonylhydrazine*

A spray composition containing 1-phenyl-2-phenylsulfonylhydrazine in a concentration of about two pounds of this compound to about 100 gallons of water, when sprayed on cauliflower leaves which were exposed to newly hatched larvae of the European corn borer, gave a 100 percent kill in 48 hours. A similar spray composition, when used in a concentration of only about one pound of the compound to 100 gallons of water under the same conditions, gave a 99.4 percent kill in 48 hours.

A dust composition prepared by intimately mixing one part of the above compound with three parts of pyrax, or pyrophyllite, when dusted on pumpkin leaves which were fed to the fourth instar melon worm, gave a 96 percent kill in three days, as against a 79 percent kill with a diluted DDT dust in the same period.

A spray composition, in a concentration of the above 1:3 mixture of the compound with pyrax or pyrophyllite per 100 gallons of water, gave a 100 percent kill in three days on the same insect.

A dust composition prepared by intimately mixing one part of the compound with three parts of pyrax or pyrophyllite, when dusted on collard leaves which were fed to the fourth instar southern army worm, gave a 100 percent kill in two days as against a 42 percent kill with a dilute DDT dust in the same period.

A similar dust composition prepared as above, when dusted on Swiss chard leaves which were fed to the fourth instar southern beet web worm, gave a 100 percent mortality in three days.

A spray composition, in a concentration of four pounds of the above 1:3 mixture of compound and pyrax or pyrophyllite per 100 gallons of water, gave a 100 percent kill in three days on the same insect.

A smear composition comprising the above compound in benzol mixed with lampblack and applied as a smear to domestic animals infested with newly hatched screwworm larvae, gave complete control at a concentration of 0.1 percent to 0.17 percent of the compound.

Example 2

1-phenyl-2-(p-tolylsulfonyl) hydrazine

A dust composition containing 1-phenyl-2-(p-tolylsulfonyl) hydrazine, when dusted on collard leaves which were fed to the fourth instar southern army worm, gave a 100 percent kill in three days. Similarly, a spray composition when used in a concentration of 8 pounds per 100 gallons of water, gave a 100 percent mortality in three days.

A dust composition, when dusted on pumpkin leaves which were fed to the fourth instar melon worm, gave a 100 percent kill in three days.

A spray composition, containing the compound in a concentration of about two pounds of the compound per 100 gallons of water, when sprayed on cauliflower leaves which were exposed to newly hatched larvae of the European corn borer, gave a 96.5 percent kill in two days, and when used in a concentration of about four pounds of the compound per 100 gallons of water on the same insect, gave a 99.5 percent kill in the same time.

A dust composition, when dusted on Swiss chard leaves which were fed to the fourth instar southern beet webworm, gave a 100 percent kill in three days.

A spray composition, when used in a concentration of 8 pounds per 100 gallons of water, gave a 96 percent kill in three days on the same insect and under the same conditions shown above.

A smear composition, comprising the compound in benzol mixed with lampblack and applied as a smear to domestic animals infested with newly hatched larvae of the screwworm, gave complete control at a concentration of 0.17 percent to 0.33 percent of the compound.

It was found that both of the compounds indicated in Examples 1 and 2 were practically harmless to various types of foliage such as pumpkin, collard, peas, beets, and Swiss chard.

It is to be understood that the above examples are not to be construed as limiting either the method of application of these novel insecticides or the kind of insects to which they may be applied.

Having thus described my invention, I claim:

1. An insecticidal composition comprising a compound of the general formula

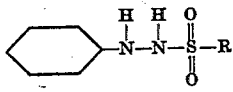

in which R is selected from the group consisting of phenyl and tolyl radicals, incorporated in a carrier selected from the group consisting of a mixture of a dust and a sticking agent and a mixture of a dust, a wetting agent, and water.

2. An insecticidal composition comprising 1-phenyl-2-phenylsulfonylhydrazine incorporated in a carrier selected from the group consisting of a mixture of a dust and a sticking agent and a mixture of a dust, a wetting agent, and water.

3. An insecticidal composition comprising 1-phenyl-2-(p-tolylsulfonyl) hydrazine incorporated in a carrier selected from the group consisting of a mixture of a dust and a sticking agent and a mixture of a dust, a wetting agent, and water.

4. An insecticidal composition comprising pyrophyllite, a sticking agent, and a compound of the general formula

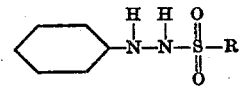

in which R is selected from the group consisting of phenyl and tolyl radicals.

5. An insecticidal composition comprising pyrophyllite, a wetting agent, water, and a compound of the general formula

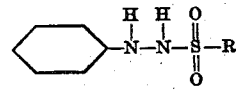

in which R is selected from the group consisting of phenyl and tolyl radicals.

6. An insecticidal composition comprising pyrophyllite, a sticking agent, and 1-phenyl-2-phenylsulfonylhydrazine.

7. An insecticidal composition comprising pyrophyllite, a sticking agent, and 1-phenyl-2-(p-tolylsulfonyl) hydrazine.

8. An insecticidal composition comprising pyrophyllite, a wetting agent, water, and 1-phenyl-2-phenylsulfonylhydrazine.

9. An insecticidal composition comprising pyrophyllite, a wetting agent, water, and 1-phenyl-2-(p-tolylsulfonyl) hydrazine.

10. The method of destroying insects comprising treating material liable to attack by said insects with an insecticidal composition containing as its essential active ingredient a compound of the general formula

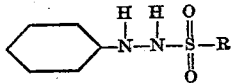

in which R is selected from the group consisting of phenyl and tolyl radicals.

11. The method of destroying insects comprising treating material liable to attack by said insects with an insecticidal composition containing as its essential active ingredient 1-phenyl-2-phenylsulfonylhydrazine.

12. The method of destroying insects comprising treating material liable to attack by said insects with an insecticidal composition containing as its essential active ingredient 1-phenyl-2(p-tolylsulfonyl) hydrazine.

13. The method of controlling infestations of screwworm in domestic animals and cattle, comprising treating the infested areas with a smear composition containing benzol, lampblack, and a low concentration of a compound of the general formula

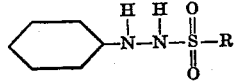

in which R is selected from the group consisting of phenyl and tolyl radicals.

SAMUEL I. GERTLER.